Figure 1:
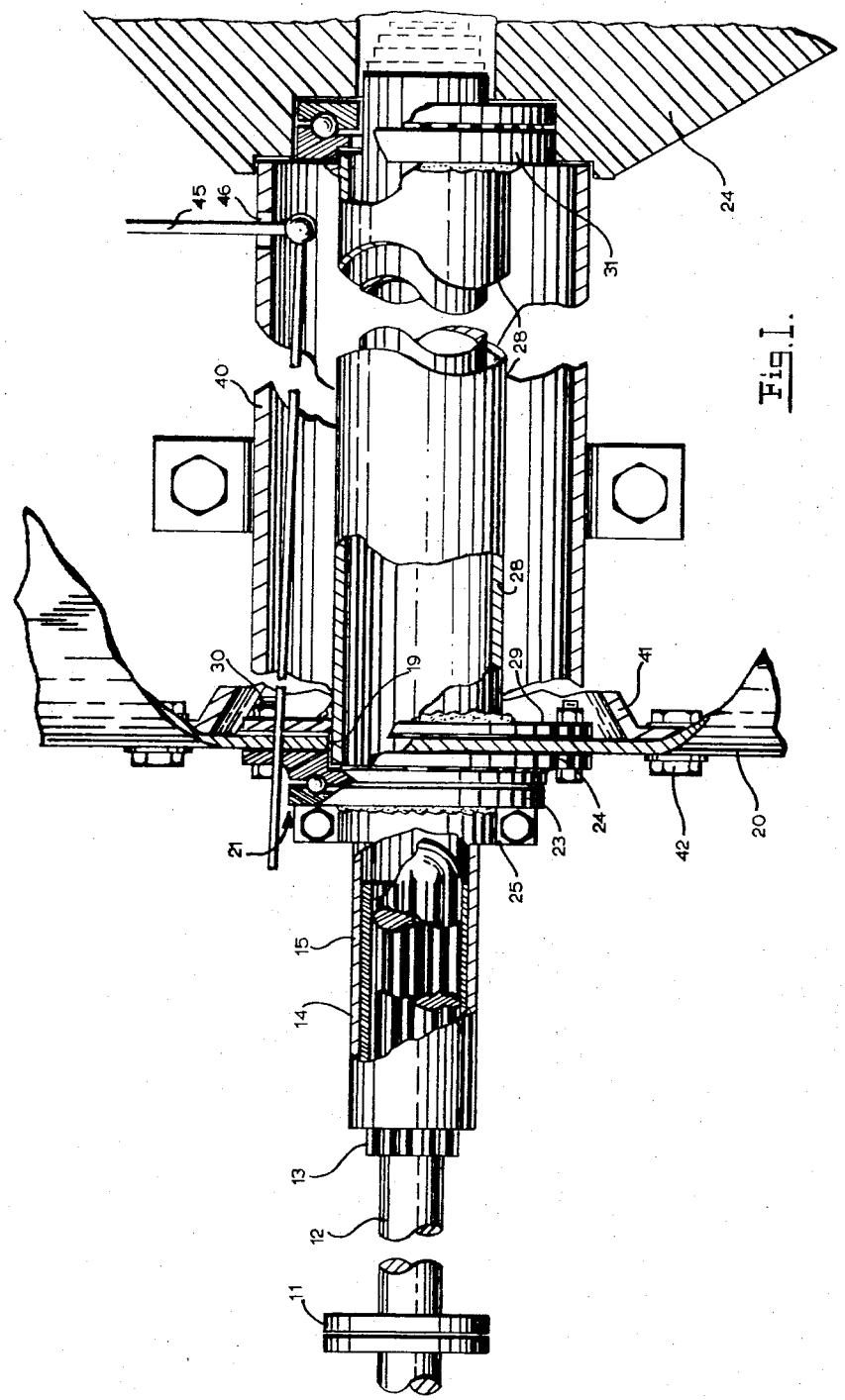

INVENTOR
CALMAN LUDWIG PAUL VON SZOMBATHY

United States Patent Office 3,364,780
Patented Jan. 23, 1968

1

3,364,780
SAFETY STEERING
Calman Ludwig Paul von Szombathy, 847 Cummings
Ave., Ottawa, Ontario, Canada
Filed Aug. 3, 1964, Ser. No. 387,161
Claims priority, application Canada, June 26, 1964,
905,973
5 Claims. (Cl. 74—493)

This invention relates to a steering shaft and more particularly to a safety steering shaft assembly for automotive vehicles.

When a motor vehicle is involved in a head-on collision, the steering column may be driven toward the driver of the vehicle thereby causing serious injury to the driver. It is, therefore, an object of this invention to provide a telescoping steering shaft assembly to substantially eliminate this hazard.

Another object of this invention is the provision of a steering shaft assembly which will decrease the amount of shock and vibration transmitted from the wheels of the vehicle through the steering column and steering wheel.

Accordingly, the present invention provides a telescoping steering shaft assembly for an automotive vehicle having a steering wheel mounted on an upper end of said shaft assembly and a steering gear adapted to be rotated by a lower end of said shaft assembly, said shaft comprising a first steering shaft section having its one end adapted to rotate said steering gear, the other end of said first section being telescopically received in and adapted to rotate with a second steering shaft section, one end of which is securable to and rotatable with said steering wheel.

Figure 2:
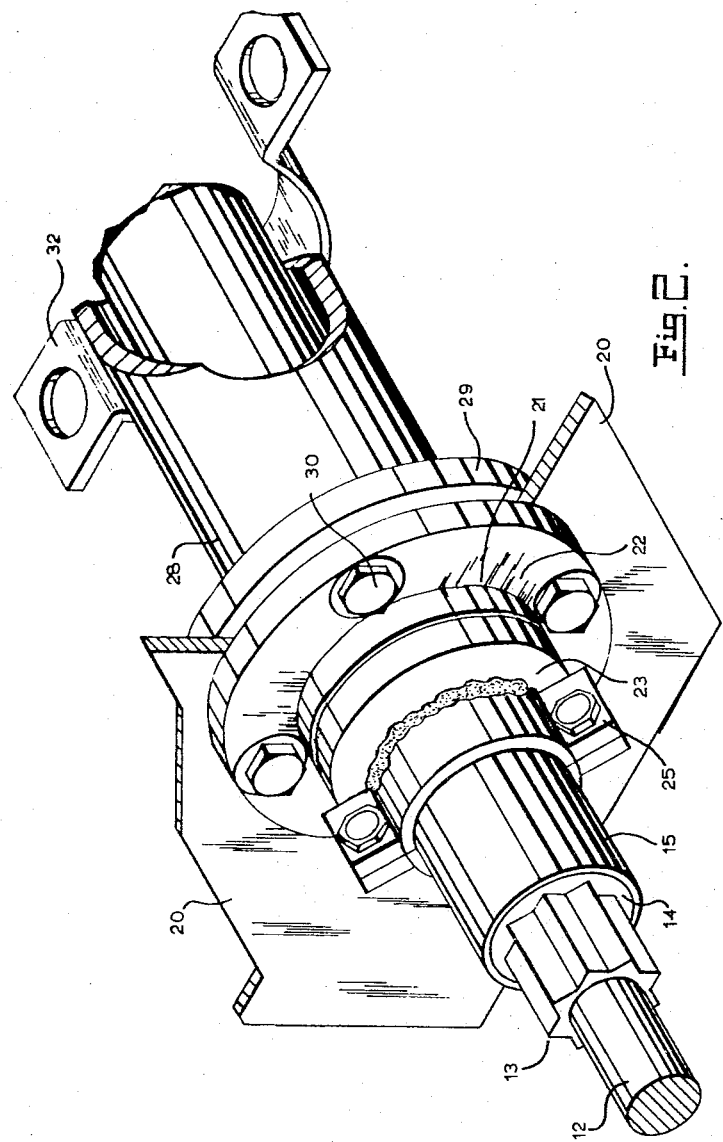
Figure 3:
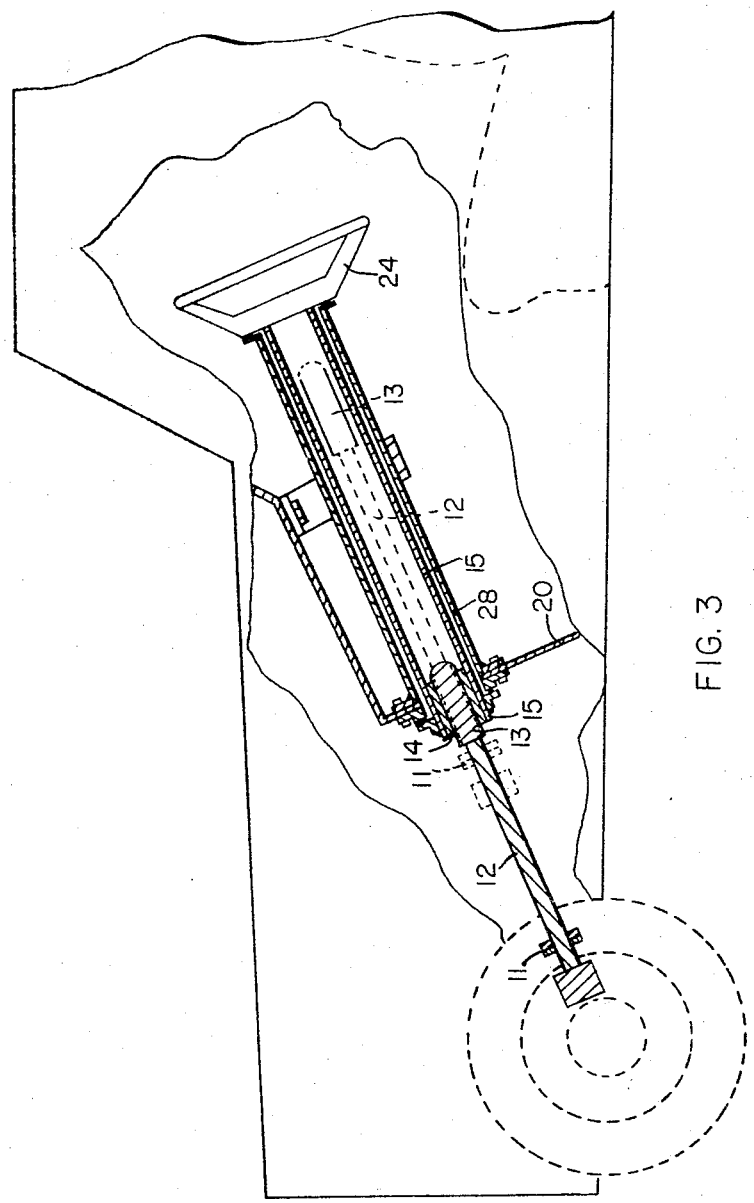

In the drawing which illustrates an embodiment of the invention,

FIG. 1 is a fragmentary perspective view of a steering column constructed in accordance with this invention, FIG. 2 is a perspective view of the lower portion of the steering shaft assembly of FIG. 1 and FIG. 3 is a diagrammatic side elevational view of the steering shaft assembly in use on an automobile.

Referring now in detail to the drawings, a steering shaft assembly is shown generally at 10 in FIG. 1. The steering shaft assembly 10 includes a coupling 11 on a lower shaft portion 12, which is adapted to connect the shaft 12 to the steering assembly (not shown). A portion adjacent the other end of the shaft 12 is provided with splines 13 and is adapted to be received in and mate with an apertured cyclindrical plug 14 received in a lower end of a hollow upper shaft portion 15. The cylindrical plug 14 is fixedly secured to the hollow shaft 15 by conventional means such as by machine screws or by welding.

The hollow shaft 15 extends through an aperture 19 in the firewall 20 of the vehicle and is journalled for rotation in a bearing assembly 21 associated with the aperture 19. The bearing assembly 20 includes a ring 22 secured to the firewall 20 and a second ring 23 adapted to rotate with the shaft 15. The second ring 23 is secured to the shaft 15 by means of a clamp 25, one portion of which is welded to the ring 23. The upper end of the hollow steering shaft 15 has a steering wheel 24 affixed thereto in a conventional manner.

A tubular housing 28 surrounds a portion of the shaft 15 between the firewall 20 and the steering wheel 24. One end of the tubular housing 28 extends through the aperture 19 in the firewall 20 and is received in the ring 22 of bearing assembly 21.

2

A collar 29 carried by the housing 28 and welded thereto is secured to the firewall 20, preferably by bolts 30 extending through suitable aligner apertures in the ring 22, the firewall 20 and the collar 29.

The shaft 15 is journalled for rotation in a second bearing assembly 31 secured to the outer end of the housing 28.

In the embodiment illustrated in FIG. 2, the tubular housing 28 is also secured to the underside of the instrument panel of the vehicle in the usual manner by a bracket 34. However, in order to provide for a gear shift lever located on the steering columns of some makes and models of vehicles, the embodiment as illustrated in FIG. 1, has an outer housing 40 surrounding the housing 28. In this case, the housing 40 is secured to the instrument panel by the clamp 32 and has a flange 41 adapted to be secured to the firewall 20 in a conventional manner, such as by bolts 42. The gear shift lever 45 extends through a suitable aperture 46 in the outer housing 40, and is connected to linkage 47 in the space provided between the housings 28 and 40. Suitable apertures (not shown) are also provided in the ring 23, the collar 29 and the firewall 20 through which the linkage 47 extends. In other respects the embodiments of FIGS. 1 and 2 are identical.

In normal operation, the safety steering assembly 10 of this invention is in most respects identical with that of a conventional steering column with the exception that road shock which would otherwise cause longitudinal movement of the steering shaft will be substantially eliminated by the ability of the lower shaft 12 to move within the hollow upper shaft 15.

During a serious collision, however, the lower steering shaft 12 may be driven some distance into the hollow upper shaft 15 by the force of the impact without causing movement of the upper hollow shaft 15.

The embodiments of the invention in which an exclusive property or privilege is claimed are defined as follows:

1. A telescoping steering shaft assembly for an automotive vehicle including a steering wheel mounted on an upper end of said shaft assembly and a steering gear adapted to be rotated by a lower end of said shaft assembly, said shaft comprising a lower steering shaft section having its one end adapted to rotate said steering gear, the other end of said lower section being adapted to be received in and mate with means provided in a hollow upper steering shaft section, one end of said upper section being securable to and rotatable with said steering wheel, said upper shaft section being secured against axial movement relative to the vehicle, said lower shaft section being adapted to pass through said means in said hollow upper shaft section whereby in the event of a collision wherein a substantial axial force is applied to said lower shaft through said steering gear, said lower shaft section is adapted to be moved into said upper shaft section, a distance approximately equal to the length of said upper shaft section.

2. A telescoping steering shaft assembly for an automotive vehicle as claimed in claim 1 wherein an outwardly splined portion is adapted to be slidably received in and rotate with a hollow upper steering shaft section, a portion of said upper section adjacent one end thereof having inwardly directed splines therein adapted to mate with said outwardly directed splines of said lower section, said lower shaft being adapted to pass through said splined portion of said upper section.

3. A telescoping steering shaft assembly as claimed in claim 2 including a housing surrounding an upper portion of said upper shaft section.

4. A telescoping steering shaft assembly as claimed in claim 3 wherein a bearing is provided, one portion of said bearing being secured to said upper section, the other portion of said bearing being secured to said vehicle whereby longitudinal movement of said upper shaft section toward an extended position is prevented.

5. A telescoping steering shaft assembly as claimed in claim 4 wherein said housing is fixedly secured to said vehicle and bearing means is provided at the upper end of said housing to support the upper end of said upper shaft section.

References Cited
UNITED STATES PATENTS

| | | | |
|---|---|---|---|
| 2,511,165 | 6/1950 | Lyman | 74—493 |
| 2,836,079 | 5/1958 | Salch | 74—493 |
| 2,937,881 | 5/1960 | Norrie | 74—493 |

FRED C. MATTERN, JR., *Primary Examiner.*

MILTON KAUFMAN, *Examiner.*

W. S. RATLIFF, *Assistant Examiner.*